United States Patent
Klein

(10) Patent No.: US 9,542,119 B2
(45) Date of Patent: Jan. 10, 2017

(54) SOLID-STATE MASS STORAGE MEDIA HAVING DATA VOLUMES WITH DIFFERENT SERVICE LEVELS FOR DIFFERENT DATA TYPES

(71) Applicant: OCZ Storage Solutions Inc., San Jose, CA (US)

(72) Inventor: Yaron Klein, Raanana (IL)

(73) Assignee: Toshiba Corporation, Tokyo (JP)

( * ) Notice: Subject to any disclaimer, the term of this patent is extended or adjusted under 35 U.S.C. 154(b) by 138 days.

(21) Appl. No.: 14/326,642

(22) Filed: Jul. 9, 2014

(65) Prior Publication Data

US 2016/0011815 A1    Jan. 14, 2016

(51) Int. Cl.
    *G06F 11/00*    (2006.01)
    *G06F 3/06*    (2006.01)
    *G06F 11/07*    (2006.01)
    *G06F 12/02*    (2006.01)

(52) U.S. Cl.
    CPC ........... *G06F 3/0644* (2013.01); *G06F 3/0619* (2013.01); *G06F 3/0679* (2013.01); *G06F 11/079* (2013.01); *G06F 11/0727* (2013.01); *G06F 12/0246* (2013.01); *G06F 12/0253* (2013.01); *G06F 11/0793* (2013.01); *G06F 2212/7211* (2013.01)

(58) Field of Classification Search
CPC .. G06F 3/0619; G06F 3/0644; G06F 11/0727; G06F 11/079; G06F 12/0246; G06F 12/0253
See application file for complete search history.

(56) References Cited

U.S. PATENT DOCUMENTS

| | | | |
|---|---|---|---|
| 7,000,088 B1 * | 2/2006 | Rudeseal | G06F 3/061 710/244 |
| 7,873,619 B1 * | 1/2011 | Faibish | G06F 17/30091 707/705 |
| 8,621,328 B2 | 12/2013 | Franceschini et al. | |
| 8,880,801 B1 * | 11/2014 | Robins | G06F 12/02 711/114 |
| 2010/0169570 A1 | 7/2010 | Mesnier et al. | |
| 2011/0283289 A1 * | 11/2011 | Jayaraman | G06F 9/5061 718/104 |
| 2012/0311566 A1 * | 12/2012 | Takaoka | H04L 41/5035 718/1 |
| 2013/0054888 A1 * | 2/2013 | Bhat | G06F 3/0604 711/114 |
| 2014/0297941 A1 * | 10/2014 | Rajani | G06F 3/0644 711/114 |
| 2014/0344216 A1 * | 11/2014 | Abercrombie | G06F 17/30575 707/609 |

* cited by examiner

*Primary Examiner* — Joshua P Lottich
(74) *Attorney, Agent, or Firm* — White & Case LLP

(57) ABSTRACT

Methods for providing non-volatile solid-state mass storage media with different service levels for different types of data associated with different applications. The method includes partitioning the non-volatile solid-state mass storage media into at least first and second volumes, individually assigning different service levels to the first and second volumes based on a type of data to be stored in the first and second volumes and based on the first and second volumes having different data retention requirements and/or data reliability requirements, and then performing service maintenance on data stored within at least the first volume according to the service level of the first volume.

26 Claims, 6 Drawing Sheets

SOLID-STATE MASS STORAGE MEDIA HAVING DATA VOLUMES WITH DIFFERENT SERVICE LEVELS FOR DIFFERENT DATA TYPES

BACKGROUND OF THE INVENTION

The present invention generally relates to solid-state mass storage media and their operation. More particularly, the present invention relates to flash-based memory devices that comprise multiple volumes and adapted to operate by exposing volumes with different service levels for different types of data.

Non-volatile solid-state memory technologies used with computers and other processing apparatuses (host systems) are currently largely focused on NAND flash memory technologies, with other emerging non-volatile solid-state memory technologies including phase change memory (PCM), resistive random access memory (RRAM), magnetoresistive random access memory (MRAM), ferromagnetic random access memory (FRAM), organic memories, and nanotechnology-based storage media such as carbon nanofiber/nanotube-based substrates. These and other non-volatile solid-state memory technologies will be collectively referred to herein as solid-state mass storage media. Mainly for cost reasons, at present the most common solid-state memory technology used in solid-state drives (SSDs) are NAND flash memory components, commonly referred to as flash-based memory devices, flash-based storage devices, flash-based media, or raw flash.

Similar to rotating media-based hard disk drives (HDDs), SSDs utilize a type of non-volatile memory media and therefore provide persistent data storage (persistency) without application of power. In comparison to HDDs, SSDs can service a READ command in a quasi-immediate operation, yielding much higher performance especially in the case of small random access read commands. This is largely due to the fact that flash-based storage devices (as well as other non-volatile solid-state mass storage media) used in SSDs are purely electronic devices that do not contain any moving parts. In addition, multi-channel architectures of modern NAND flash-based SSDs result in sequential data transfers saturating most host interfaces. A specialized case is the integration of an SSD into a hard disk drive (HDD) to form what is typically referred to as a hybrid drive. However, even in the case of a hybrid drive, the integrated SSD is functionally equivalent to a stand-alone SSD.

Another difference between HDDs and flash-based SSDs relates to the write endurance of flash-based media. Briefly, flash-based memory components store information in an array of floating-gate transistors, referred to as cells. NAND flash memory cells are organized in what are commonly referred to as pages, which in turn are organized in predetermined sections of the component referred to as memory blocks (or sectors). Each cell of a NAND flash memory component has a top gate (TG) and a floating gate (FG), the latter being sandwiched between the top gate and the channel of the cell. The floating gate is separated from the channel by an oxide layer, often referred to as the tunnel oxide. Data are stored in a NAND flash memory cell in the form of a charge on the floating gate which, in turn, defines the channel properties of the NAND flash memory cell by either augmenting or opposing the charge of the top gate. This charge on the floating gate is achieved by applying a programming voltage to the top gate. The process of programming (writing 0's to) a NAND cell requires injection of electrons into the floating gate by quantum mechanical tunneling, whereas the process of erasing (writing 1's to) a NAND cell requires applying an erase voltage to the device substrate, which then pulls electrons from the floating gate. Programming and erasing NAND flash memory cells is an extremely harsh process utilizing strong electrical fields to move electrons through the oxide layer. After multiple writes to a flash memory cell, it will inadvertently suffer from write endurance problems caused by the breakdown of the oxide layer. With smaller process geometries becoming more prevalent, write endurance problems are becoming increasingly important.

Another difference between HDDs and NAND flash memory technology relates to data retention, that is, the maximum time after which data is written that the information is still guaranteed to be valid and correct. Whereas HDDs retain data for a practically unlimited period of time, NAND flash memory cells are subjected to leakage currents that cause the programming charge to dissipate and hence result in data loss. Retention time for NAND flash memory may vary between different levels of reliability, for example, about five years in an enterprise environment to about one to three years in consumer products. Retention problems are also becoming increasingly important with smaller process geometries.

Data access and reliability-related characteristics and requirements associated with volatile and non-volatile memory components are collectively referred to herein as service levels and encompass such requirements as persistence, validity, write endurance, retention, etc. In view of the above, to be considered as viable storage alternatives to HDDs, SSDs using flash-based solid-state mass storage devices are required to meet certain service levels that include write endurance and retention time. Write endurance can be addressed by, for example, wear leveling techniques based on the number of P/E (program/erase) cycles among memory blocks. The retention constraint has mandated various mechanisms. As an example, the number of P/E cycles may be limited to satisfy the service level probability of the retention requirement. Strong error correction, such as through the use of error checking and correction (ECC) algorithms, can also be applied to reduce errors over time. With decreasing process geometries, constant data scrubbing is required to counteract increasing failure rates associated with retention. As known in the art, scrubbing generally refers to refreshing data by reading data from a memory component, correcting any errors, then writing the data back, usually to a different physical location within the memory component.

Flash-based memory technologies are seldom used as a system memory replacement in host systems, as opposed to a mass storage replacement that takes advantage of the large capacity of flash-based memory components. An intuitive example is in the use of swap files. Modern computer system memory are typically made up of random access memory (RAM) integrated circuit (IC) components, often SDRAM (synchronous dynamic random access memory). As the RAM area of system memory may often be limited and insufficient, operating systems of computers often use the disk area of an HDD as a swap file to temporarily dump and retrieve memory. Another example of such usage is by applications, such as temporary space by databases (e.g., TempDB in SQL Server).

Although traditionally provided by HDDs, system memory replacement does not require the long retention or even persistency offered by HDDs. A typical retention period for a swap file is very short (typically a few minutes at most) and can be limited to a day. Hence, mechanisms that limit the P/E cycles can be relaxed for such files or data, as there is no requirement to be able to read the data very far into the future.

Other applications that have been introduced with flash-based media can further relax more constraints. For example, a flash read cache application can handle loss of data as it can use the production volume's data (the cache just holds a local copy of the same data). That is, the application can use error detection mechanisms to verify data correctness and can tolerate data errors returned from the flash-based media. Also, persistence is not required in this case as again, the reference copy of the data is always available. Hence, such applications can allow even lower levels of data assurance.

In view of the above, different applications require different service levels from flash-based media in terms of retention, persistence and validity, and the use of a device with the highest service level for all data places unnecessary constraints and reduces efficient utilization of flash-based media.

The concept of exposing different logical unit numbers (LUNs), representing multiple volumes, with different service levels is well known in the storage industry. For example, U.S. Patent Application Publication No. 2010/0169570 addresses the issue from a performance perspective, providing different quality of service (QoS) levels to each volume. That is, volumes are configured to provide different performance metrics (for example, input/output (IO) operations per second (IOPS), bandwidth, latency, etc.) and assigned to different applications according to their importance and requirements.

However, flash-based storage is by nature a high performance volume. Hence, the above service level characteristics do not apply for such volumes. Instead, and as mentioned above, service level characteristics for flash-based storage generally relate to the endurance and retention levels of the data. These characteristics have been addressed from different perspectives. For example, U.S. Pat. No. 8,621,328 discloses memory that is logically divided into regions, and in which data are stored applying different error correction for dynamic data and static data.

BRIEF DESCRIPTION OF THE INVENTION

The present invention provides methods for providing non-volatile solid-state mass storage media with different service levels for different types of data associated with different applications, and in doing so provides the opportunity for promoting more optimal usage of the storage media.

According to an aspect of the invention, a method of storing data on non-volatile solid-state mass storage media includes partitioning the non-volatile solid-state mass storage media into at least first and second volumes, individually assigning different service levels to the first and second volumes based on a type of data to be stored in the first and second volumes and based on the first and second volumes having different data retention requirements and/or data reliability requirements, and then performing service maintenance on data stored within at least the first volume according to the service level of the first volume.

Another aspect of the invention is a non-volatile solid-state mass storage media adapted to perform a method comprising the steps described above.

Technical effects of the method and non-volatile solid-state mass storage media described above preferably include the ability to use the media as replacement or complementary memory media for volatile system memory media and HDD storage media, and in particular to selectively utilize certain features and attributes of the media for such purposes, including the high storage capacity and random access performance of the non-volatile solid-state mass storage media, while also preferably accommodating and/or adjusting for data retention and write endurance limitations often associated with such media.

Other aspects and advantages of this invention will be better appreciated from the following detailed description.

DETAILED DESCRIPTION OF THE INVENTION

Figure 1:
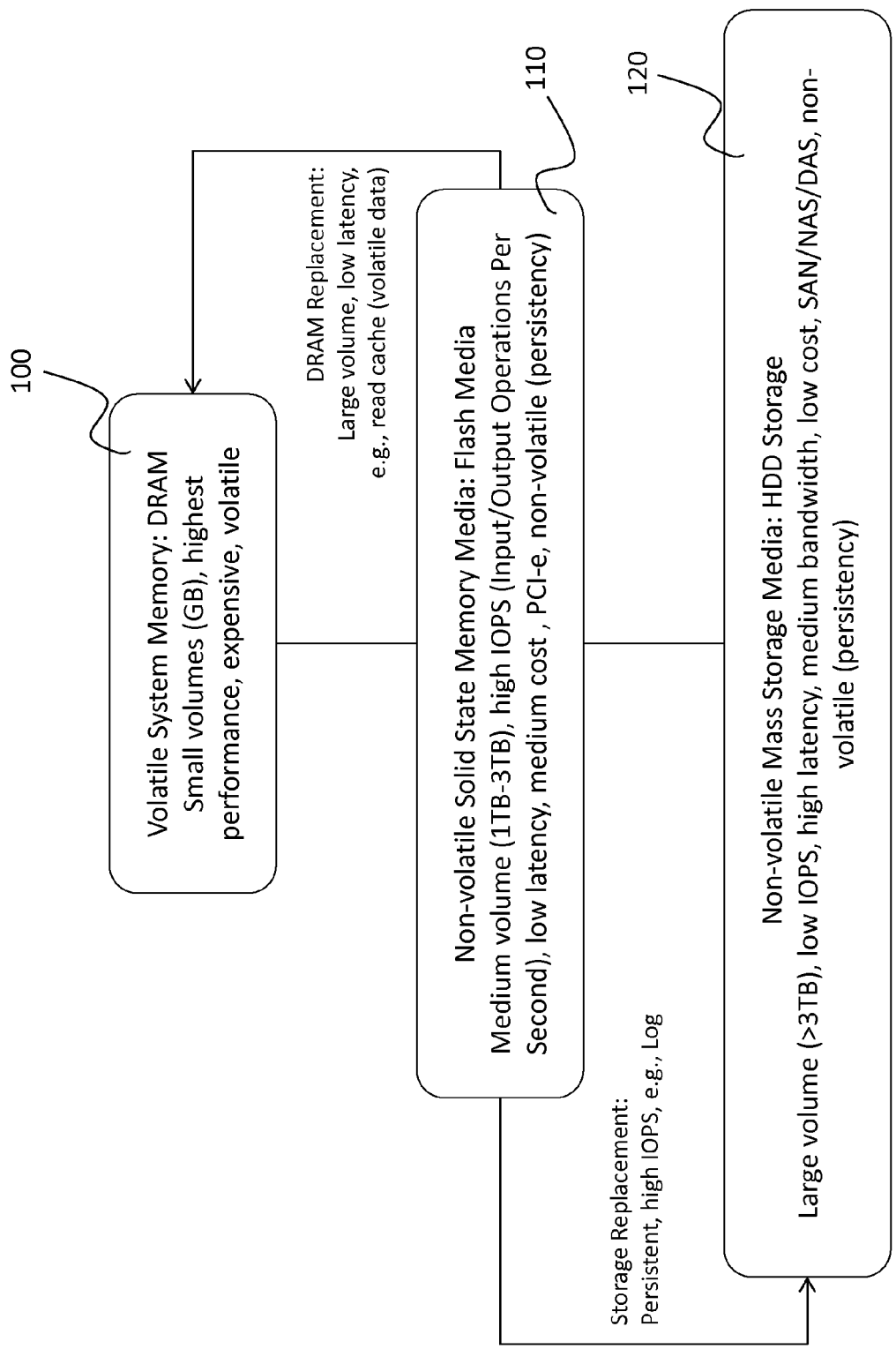
FIG. 1 is a block diagram that represents DRAM memory media, flash-based memory storage media, and HDD storage media and properties thereof for use in a host system, as well as indications for the use of flash-based memory as replacement or complementary memory media for the DRAM memory media and HDD storage media.

As represented in FIG. 1, current host systems typically utilize DRAM 100 as volatile system memory media and HDD storage 120 as non-volatile mass storage media. In a typical host system, the DRAM area is a relatively small area with very high random access but no persistency, whereas the HDD storage area is relatively large with high persistency but relatively poor random access. As also represented in FIG. 1, non-volatile solid-state mass storage media 110, which in the particular nonlimiting example of FIG. 1 is identified as flash-based memory storage (flash) media 110, resides between the current computing media represented by the DRAM 100 and HDD storage 120. The flash media 110 has certain features and attributes of both DRAM 100 and HDD storage 120. For example, the capacity (volume) of flash media 110 is generally between those of DRAM 100 and HDD storage 120, and flash media 110 provide better random access performance than HDD storage 120, though less than the DRAM 100. In addition, whereas DRAM 100 are volatile memory devices and therefore do not retain data in the absence of power, flash media 110 provides data persistency though for a more limited duration as compared to HDD storage 120.

As a result, it would be desirable to utilize flash media 110 as replacement or complementary media in a manner that addresses weaknesses in certain features of DRAM 100 and HDD storage 120. In the following discussion, the utilization of flash-based media as replacement and/or complementary memory media for volatile system memory media or non-volatile mass storage media will simply be referred to as "replacement" memory media as a matter of convenience, unless indicated otherwise. As indicated in FIG. 1, as a replacement or complementary memory media for DRAM 100 (referred to as "DRAM Replacement" in FIG. 1) or other volatile system memory media, flash media 110 would provide complementary memory space and data persistence. As a replacement or complementary memory media for HDD storage (referred to as "Storage Replacement" in FIG. 1) or other non-volatile mass storage media, flash media 110 provides a faster tier of data storage as a result of having higher random access performance, for example, based on IOPS.

Figure 2:
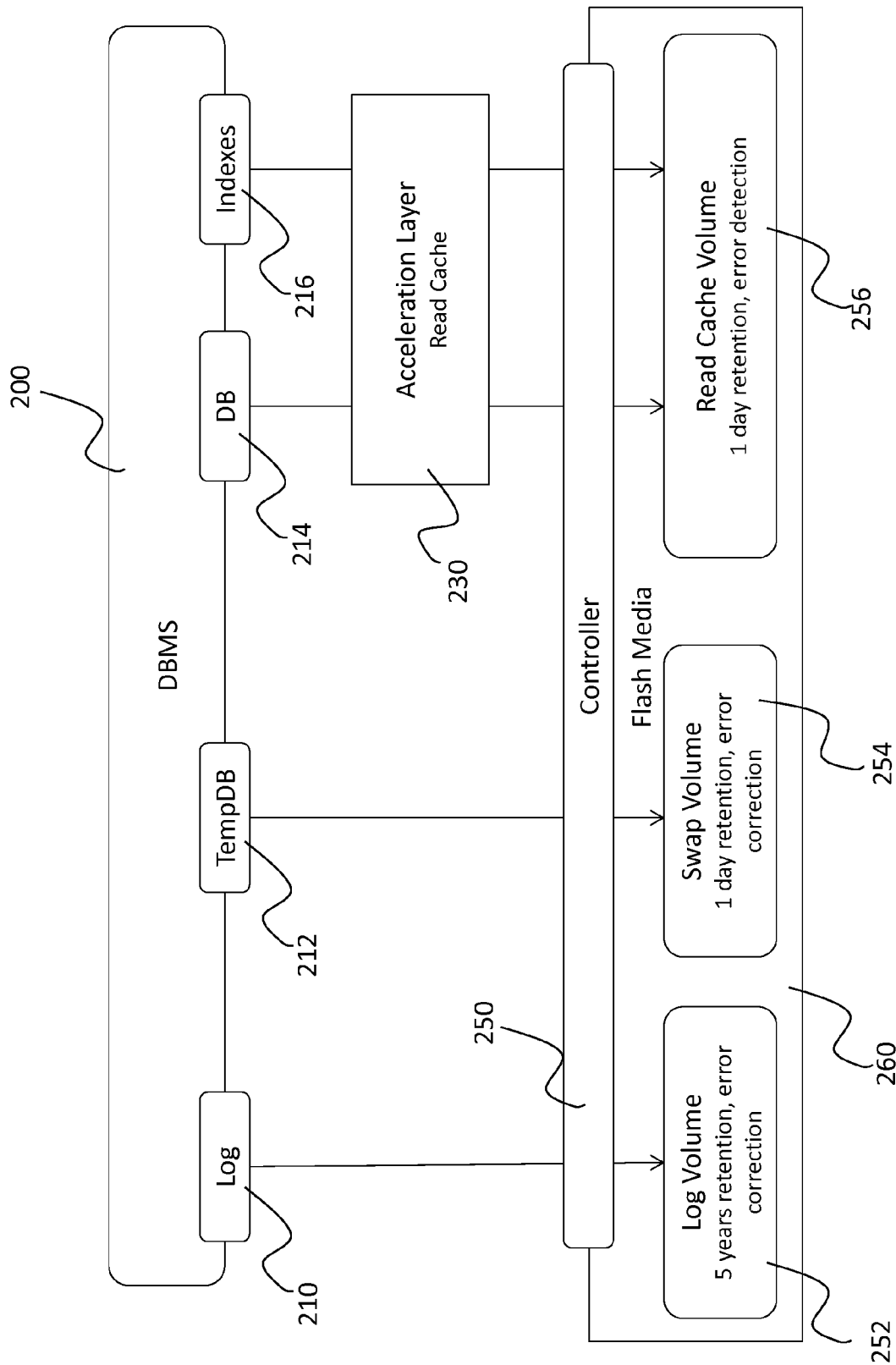
FIG. 2 is block diagram representing usage in a host system of flash-based memory storage media that provides different volumes with different service levels for different data types used in different applications operating within the host system.

FIG. 2 schematically represents a block diagram of a nonlimiting embodiment of the present invention, in which a database management system (DBMS) 200 utilizes flash media 260 through a memory controller 250, all of which are functionally connected to a host system (not shown), typically as a result of the memory controller 250 being connected to the host system via a computer bus interface. As known in the art, firmware is executed on the memory controller 250 to provide software primitive functions and provide a software protocol interface and application programming interface (API) to the host system. The flash media 260 is represented in FIG. 2 as having been partitioned to provide multiple different volumes 252, 254 and 256. Furthermore, FIG. 2 indicates different service levels as having been assigned to the different volumes 252, 254 and 256 for different data types of different applications operating within the host system. The different data types include (but are not limited to) data that may be stored in volatile and non-volatile memory spaces of a conventional host system, and the different applications include (but are not limited to) log files, databases, temporary databases, and indexes associated with the DBMS 200. As represented, the DBMS 200 is configured to open a Write Ahead Log file (Log) 210 to rapidly record all changes to a database (DB) 214. Those changes are later inserted in the database 214 itself (for example, by a background process). FIG. 2 represents information relating to the Log 210 (log information) as being stored in a log volume 252 within memory space of the flash media 260. As the log information is relatively small and can be limited (for example, by setting a size threshold for eviction from the Log 210 to the database 214), it can be placed on the flash media 260 to provide fast commit times and minimal latency. Since the log information is vital, the log volume 252 must provide long retention (preferably, for example, at least five years) and maximal reliability, in which case the log volume 252 can be considered to be a long-term storage area of the flash media 260 and preferably utilizes error correction as part of an error checking and correction (ECC) algorithm that can be performed by the controller 250. In combination, the data retention (long-term storage) and data reliability (error treatment using error detection and correction) associated with the log volume 252 constitutes a type of service level.

The DBMS 200 is represented as using a temporary database space (TempDB) 212 for maintaining calculations and other temporary information created during analysis processes. The temporary space 212 is desirable if the DRAM (e.g., DRAM 100 of FIG. 1 or other volatile system memory media) of the host system is not sufficiently large for the desired operation of the host system. Usually the DRAM would be used as a first tier of temporary data and processed information would be placed on a dedicated temporary location (e.g., SQL Server's TempDB) of an HDD. FIG. 2 represents the temporary data as being stored in a swap volume 254 within memory space of the flash media 260. As swap information life expectancy is relatively short, the retention of this volume 254 may be in a range of days at most (for example, one to two days, though longer retention is possible), in which case the swap volume 254 can be viewed as a short-term storage area of the flash media 260. Also, as the swap volume 254 serves as replacement memory media for volatile system memory media (e.g., DRAM 100), there is no need for persistency in this volume 254 since the data stored in volatile memory media are not persistent. However, as indicated in FIG. 2, the swap volume 254 preferably utilizes error correction as part of an ECC algorithm that can be performed by the controller 250. In combination, the data retention (short-term storage) and data reliability (error treatment using error detection and correction) associated with the swap volume 254 constitutes a type of service level that is different from the service level of the log volume 252.

The DBMS 200 stores information in large files containing a plurality of records within the database 214 and preferably utilizes indexes 216 to improve performance. Although small databases can be placed entirely on a flash device, typical DBMS 200 would require a back-end storage system to store all the database information. The flash media 260 represented in FIG. 2 can be used to accelerate the access to this information via a read cache application within an acceleration layer 230 and a read cache volume 256 within memory space of the flash media 260. Because the read cache volume 256 serves as replacement memory media for volatile system memory media (effectively enlarging the DRAM cache), this volume 256 does not require persistency or long retention and therefore can be viewed as a short-term storage area of the flash media 260. Furthermore, as the data reside in the back-end storage, loss of data is tolerated as long as it can be detected. Hence, the read cache volume 256 preferably utilizes error detection, in other words, the read cache application is made aware that errors have occurred, but that the data remain in error, not corrected, and not to be used. Error detection utilized by the read cache volume 256 can be performed by the controller 250, but does not require error correction using an ECC algorithm. In combination, the data retention (short-term storage) and data reliability (error treatment using error detection) associated with the read cache volume 256 constitutes a type of service level that is different from the service levels of the log and swap volumes 252 and 254.

Though three different volumes 252, 254 and 256 are represented in FIG. 2, fewer and greater numbers of volumes could be partitioned on the flash media 260. According to particular but nonlimiting embodiments of the invention, each of the volumes 252, 254 and 256 can be provided by the same flash component through its controller 250. A user can be permitted to configure the size of each volume 252, 254 and 256 and its type (for example, log, swap, or read cache). As known in the art, hardware and firmware elements in the controller 250 or otherwise associated with the flash media 260 can be used to partition the different volumes 252, 254 and 256 and assign their desired different service levels relating to data retention and write endurance, and/or internal components such as a flash management system can be used to relax P/E cycle count limitations and/or switch between error detection and error correction for the different volumes 252, 254 and 256 to assign their desired different service levels. For example, a user can configure the flash media 260 via an API and management software such that the flash media 260 exposes the volumes 252, 254 and 256 to the host system. Standard storage API commands for this purpose include, but are not limited to, SCSI Inquiry, SCSI Report LUN, SCSI Get Capacity, etc. The flash media 260 may, but is not required, to use all flash-based media, in other words, flash memory blocks (sectors) as a single pool to provide the desired volumes 252, 254 and 256 and their different service levels.

Figure 3:
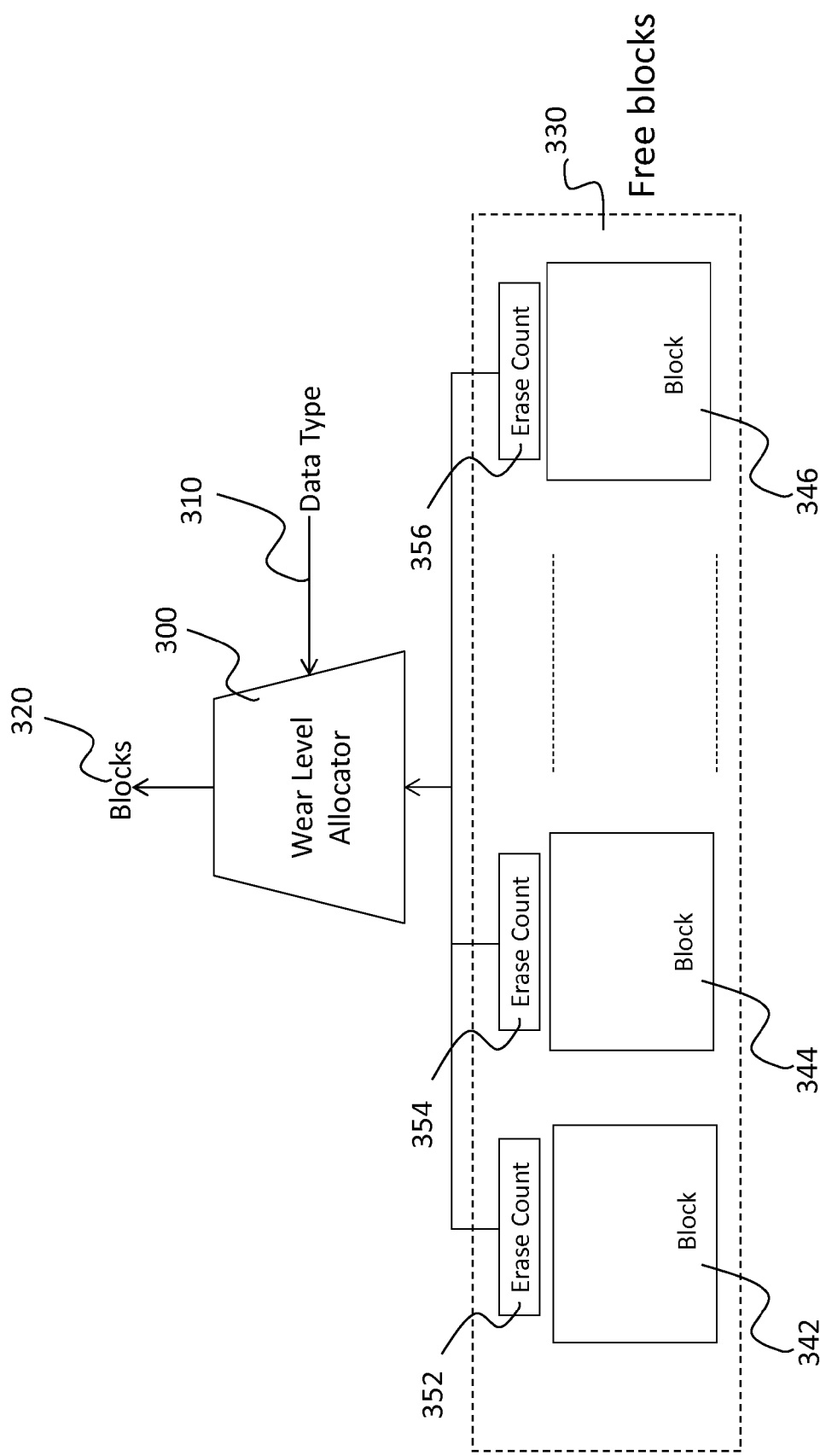
FIG. 3 is a block diagram of a wear-leveling process that can be performed with a flash-based memory storage media utilized, for example, as represented in FIG. 2.

FIGS. 3 through 6 represent different manners by which service maintenance can be individually performed on data of different volumes partitioned on non-volatile solid-state mass storage media, such as the volumes 252, 254, and 256 on the flash media 260, according to different service levels that have been assigned to the volumes. FIG. 3 schematically represents flash blocks 342, 344 and 346 (for example, of the flash media 260 of FIG. 2) arranged in a single pool 330. Each block 342, 344 and 346 (each made up of multiple pages comprising multiple memory cells) has a corresponding erase count 352, 354 and 356, which indicates the number of times the block 342, 344, or 346 was erased (and programmed). According to a nonlimiting embodiment of the invention, a wear-leveling process can be performed on the blocks 342, 344 and 346 to provide different erase levels to blocks associated with different volumes within the flash media, for example, the volumes 252, 254, and 256 of FIG. 2. When a volume needs one or more new blocks to write incoming data, it receives such blocks 320 from a wear level allocator 300 according to a data type associated with a service level 310 associated with that volume. As a new erased block becomes available to the volume, the blocks 320 will have an erase count that is less than that required by the service level 310 specified for the particular data type to be stored in the volume, for example, the log, TempDB, DB or index data of FIG. 2.

Figure 4:
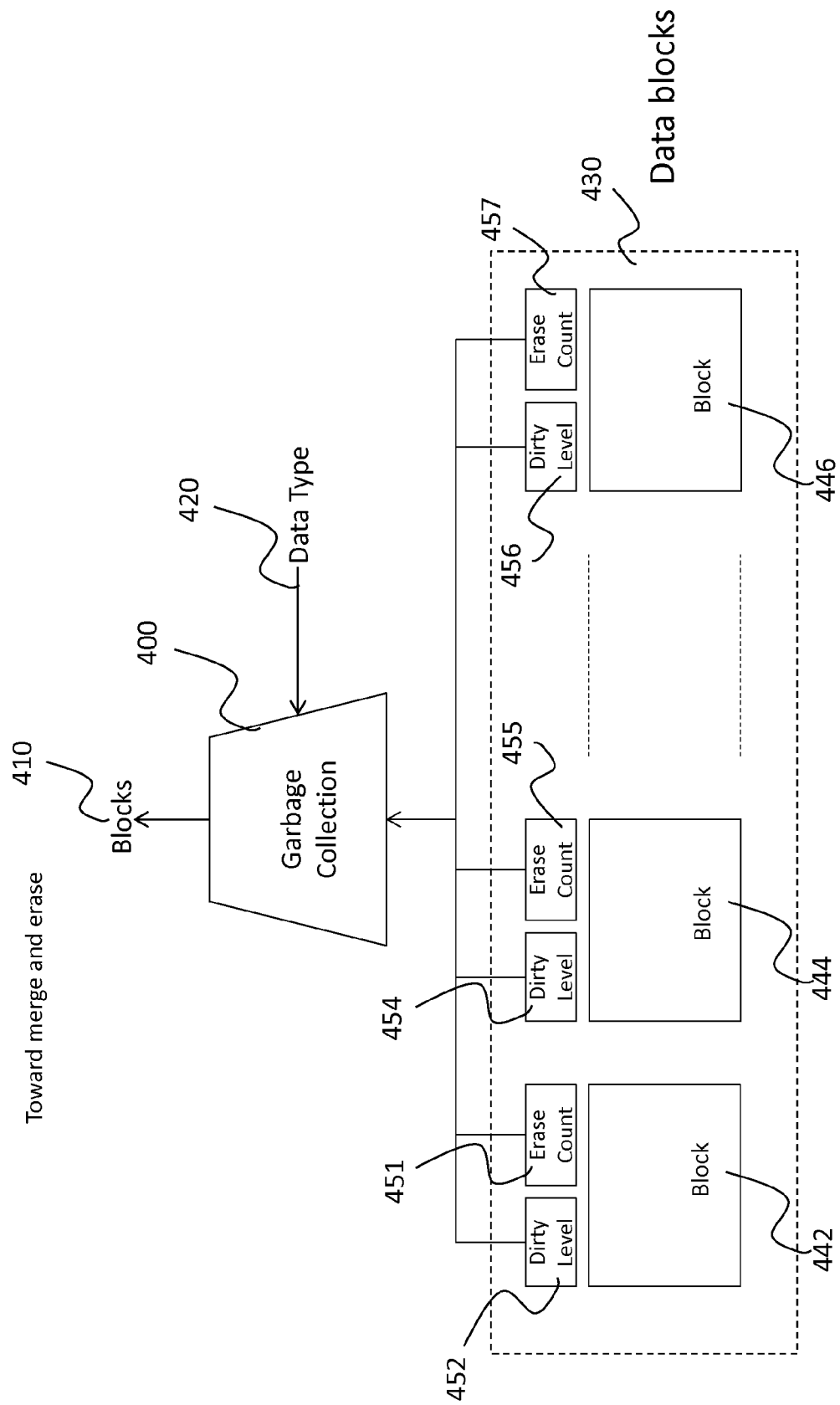
FIG. 4 is a block diagram of a garbage collection process that can be performed with a flash-based memory storage media utilized, for example, as represented in FIG. 2.

FIG. 4 schematically represents flash blocks 442, 444 and 446 (for example, of the flash media 260 of FIG. 2) arranged in a single pool 430, and each block 442, 444 and 446 having a corresponding erase count 451, 455 or 457, and a dirty level mark 452, 454, or 456 (denoted the number of dirty pages in the block 442, 444 or 446). According to a nonlimiting embodiment of the invention, a garbage collection process 400 can be performed on the blocks 442, 444 and 446 in the background to erase dirty blocks or merge blocks with high levels of dirty data. A dirty block, in other words, a block in which all pages therein are dirty, is erased and sent to a free pages pool. Also according to a nonlimiting embodiment of the invention, following a request for one or more free blocks for a volume (and, therefore, requiring a particular data type and service level), one or more blocks 410 can be selected as candidates for merger and erase according to their dirty level, erase count and data type 420 associated with a service level consistent with the volume, for example, the log, TempDB, DB or index data of FIG. 2.

Figure 5:
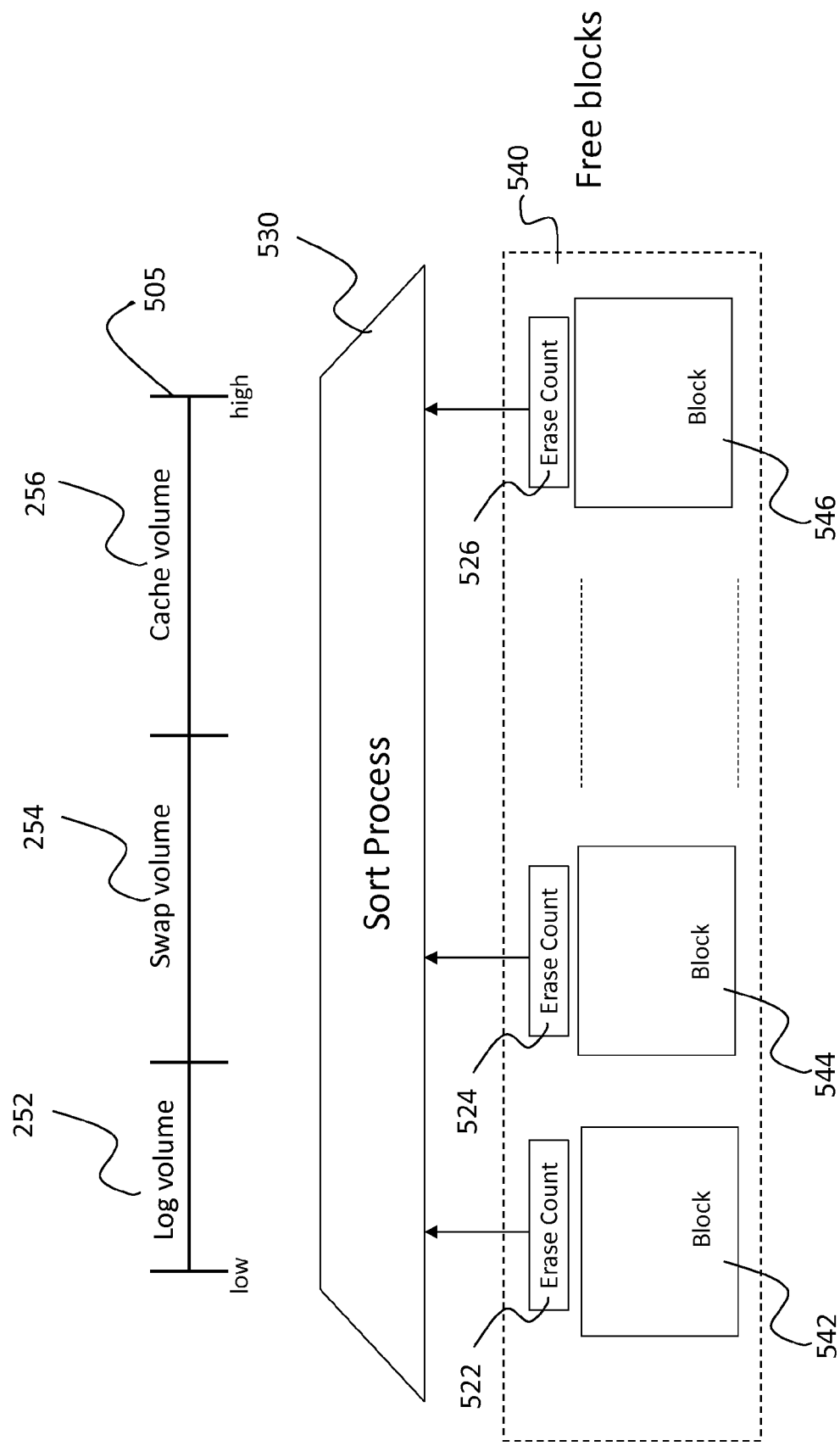
FIG. 5 is a block diagram of a background erase process that can be performed with a flash-based memory storage media utilized, for example, as represented in FIG. 2.

FIG. 5 schematically represents flash blocks 542, 544 and 546 (for example, of the flash media 260 of FIG. 2) arranged in a single pool 540, and each block 542, 544 and 546 having a corresponding erase count 522, 524 or 526. According to a nonlimiting embodiment of the invention, a block allocation algorithm can be performed on the blocks 442, 444 and 446 in which the free blocks 542, 544 and 546 within the pool 540 are arranged by a sort process 530 into a list 505 according to their erase counts 522, 524 and 526, ranging from relatively "low" to "high" erase counts. With nonlimiting reference to the log, swap, and read cache volumes 252, 254, and 256 of FIG. 2, free blocks within the pool 540 can be allocated to the volumes 252, 254 and 256 based on the erase counts 522, 524 and 526 of the blocks. For example, if the log volume 252 requires a free block, the sort process 530 can provide a block with the smallest erase count (i.e., the first in the sorted list 505) to the log volume 252. Likewise, if the cache volume 256 requires a free block, the sort process 530 will allocate a block with a high erase count, e.g., a block from the highest 10% of the free blocks. As a corollary, the log volume 252 can be provided with blocks having relatively lower P/E cycles than the cache volume 256 to meet the higher data retention reliability required of the log volume 252.

Figure 6:
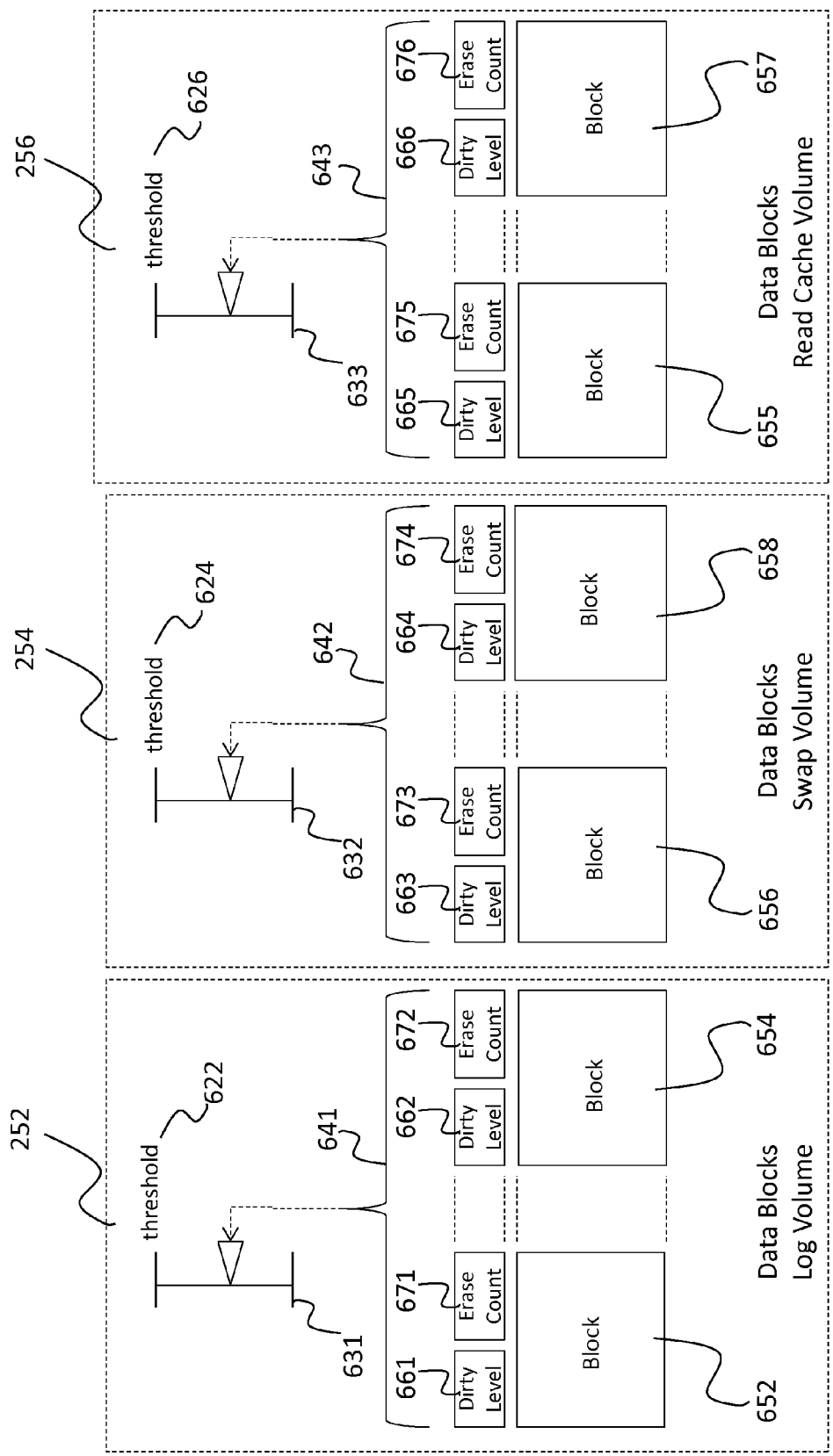
FIG. 6 is a block diagram of a garbage collection process that can be performed with a flash-based memory storage media utilized, for example, as represented in FIG. 2.

As an alternative to the garbage collection scheme of FIG. 4, FIG. 6 represents a garbage collection process that can be performed on different volumes on flash media, for example, the log, swap, and read cache volumes 252, 254, and 256 of the flash media 260 of FIG. 2. Each volume 252, 254, and 256 maintains a set of values 641, 642 and 643 which include dirty level indicators 661, 662, 663, 664, 665 and 666 and erase counts 671, 672, 673, 674, 675 and 676 for each of individual data block 652, 654, 656, 658, 655 and 657 within the volumes 252, 254, and 256.

According to a nonlimiting embodiment of the invention, if the number of available blocks for the log volume 252 (i.e., free blocks with low erase counts) is below a threshold 622 and the number of partially dirty blocks is above a second threshold 631, the garbage collection process starts merging blocks from the log volume 252, and preferred candidates for merging are blocks with the highest dirty levels 661 and 662 within the log volume 252. Also according to a nonlimiting embodiment of the invention, if the number of available blocks for the swap volume 254 is below a threshold 624 and the number of partially dirty blocks is above a second threshold 632, the garbage collection process starts merging blocks from the swap volume 254, and preferred candidates for merging are blocks with the highest dirty level 663 and 664 within the swap volume 254. Still further according to a nonlimiting embodiment of the invention, if the number of available blocks for the cache volume 256 is below a threshold 626 and the number of partially dirty blocks is above a second threshold 633, the garbage collection process starts merging blocks from the cache volume 256, and preferred candidates for merging are blocks with the highest dirty level 665 and 666 within the cache volume 256. Hence, as a corollary of these actions, each volume 252, 254 and 256 can be provided with a pool of blocks for a write peak. The decision criteria for a merge in the garbage collection process can be chosen to provide different levels of reliability. In addition, the criteria for the swap volume 254 can be relaxed to reduce the chance of block shortage in a write peak.

While the invention has been described in terms of specific embodiments, it is apparent that other forms could be adopted by one skilled in the art. Therefore, the scope of the invention is to be limited only by the following claims.

The invention claimed is:

1. A method of storing data on a non-volatile solid-state mass storage media functionally connected to a host system, the method comprising:
   partitioning the non-volatile solid-state mass storage media into at least first and second volumes;
   individually assigning different service levels to the first and second volumes based on a type of data to be stored in the first and second volumes and based on the first and second volumes having different data retention and data reliability requirements; and
   performing service maintenance on data stored within at least the first volume according to the service level of the first volume.

2. The method of claim 1, wherein the non-volatile solid-state mass storage media is flash-based memory media.

3. The method of claim 1, wherein the host system further has volatile system memory media functionally connected thereto, and the method further comprises utilizing the non-volatile solid-state mass storage media as complimentary or replacement memory media for the volatile system memory media.

4. The method of claim 1, wherein the service maintenance performed on the data stored within the first volume comprises an error treatment that is different than the service level of the second volume.

5. The method of claim 4, wherein the error treatment comprises error checking and correction.

6. The method of claim 4, wherein the error treatment comprises error detection but not error correction.

7. The method of claim 4, wherein the error treatment comprises a different P/E cycle count limitation of the first volume.

8. The method of claim 1, wherein the data stored on the first volume are log data, and the first volume is assigned a higher endurance and/or higher retention service level than the second volume.

9. The method of claim 1, wherein the data stored on the first volume are swap data, and the first volume is assigned an endurance and/or retention service level that is higher than an endurance and/or retention service level of the second volume but lower than an endurance and/or retention service level assigned to a third volume partitioned on the non-volatile solid-state mass storage media.

10. The method of claim 1, wherein the data stored on the first volume are cache data, and the first volume is assigned a lower endurance and/or lower retention service level than the second volume.

11. The method of claim 1, wherein the first and second volumes each comprise a plurality of blocks each having an erase count, the method further comprising:
performing wear leveling on the data of each of the first and second volumes according to the different service levels of the first and second volumes; and
providing a new block to the first volume for writing incoming data thereto, the new block being selected to have an erase count less than an erase count threshold corresponding to the service level of the first volume.

12. The method of claim 1, wherein the first and second volumes each comprise a plurality of blocks each having an erase count and a dirty page count, the method further comprising:
performing garbage collection on the data of each of the first and second volumes according to the different service levels of the first and second volumes, wherein blocks having a dirty page count above a predetermined threshold are erased and sent to a free pages pool; and
providing a new block from the free pages pool to the first volume for writing incoming data thereto.

13. A non-volatile solid-state mass storage media comprising:
non-volatile solid-state memory partitioned into a plurality of volumes, each volume of the plurality of volumes having an individually assigned service level based on a type of data to be stored in the volume, a data retention requirement, and a data reliability requirement, wherein
at least one volume of the plurality of volumes having a different data retention and data reliability requirements than another volume of the plurality of volumes.

14. The non-volatile solid-state mass storage media of claim 13, wherein each volume of the plurality of volumes is configured to receive service maintenance on data stored in the volume according to the individually assigned service level.

15. The non-volatile solid-state mass storage media of claim 13, wherein the non-volatile solid-state memory is flash-based memory media.

16. The non-volatile solid-state mass storage media of claim 14, wherein the service maintenance comprises wear leveling.

17. The non-volatile solid-state mass storage media of claim 14, wherein the service maintenance comprises garbage collection.

18. The non-volatile solid-state mass storage media of claim 14, wherein the service maintenance comprises an error treatment.

19. The non-volatile solid-state mass storage media of claim 18, wherein at least one volume of the plurality of volumes having a different error treatment than another volume of the plurality of volumes.

20. The non-volatile solid-state mass storage media of claim 18, wherein the error treatment comprises error checking and correction.

21. The non-volatile solid-state mass storage media of claim 18, wherein the error treatment comprises error detection but not error correction.

22. The non-volatile solid-state mass storage media of claim 18, wherein the error treatment comprises a P/E cycle count limitation of the volume.

23. The non-volatile solid-state mass storage media of claim 13, wherein a first volume of the plurality of volumes is configured to store log data, and the first volume is assigned an endurance and/or retention service level that is higher than another of the plurality of volumes.

24. The non-volatile solid-state mass storage media of claim 13, wherein a first volume of the plurality of volumes is configured to store swap data, the first volume is assigned an endurance and/or retention service level that is higher than an endurance and/or retention service level of a second volume of the plurality of volumes, but lower than an endurance and/or retention service level of a third volume of the plurality of volumes.

25. The non-volatile solid-state mass storage media of claim 13, wherein one or more volumes of the plurality of volumes is configured to store a plurality of blocks each having an erase count, and the one or more volumes are configured to write incoming data to a block having an erase count less than an erase count threshold corresponding to the service level.

26. The non-volatile solid-state mass storage media of claim 13, wherein
one or more volumes of the plurality of volumes comprises a plurality of blocks each having an erase count and a dirty page count, and
the one or more volumes are configured to write incoming data to a new block from a free pages pool, the free pages pool comprising one or more blocks having a dirty page count above a predetermined threshold, and the new block corresponding to an erased block from the free pages pool.

* * * * *